March 24, 1936.　　　　R. C. JOHNSON　　　　2,035,268
TEXTILE MANUFACTURE
Filed May 19, 1934　　　7 Sheets-Sheet 1

INVENTOR
R. C. Johnson
BY
ATTORNEYS

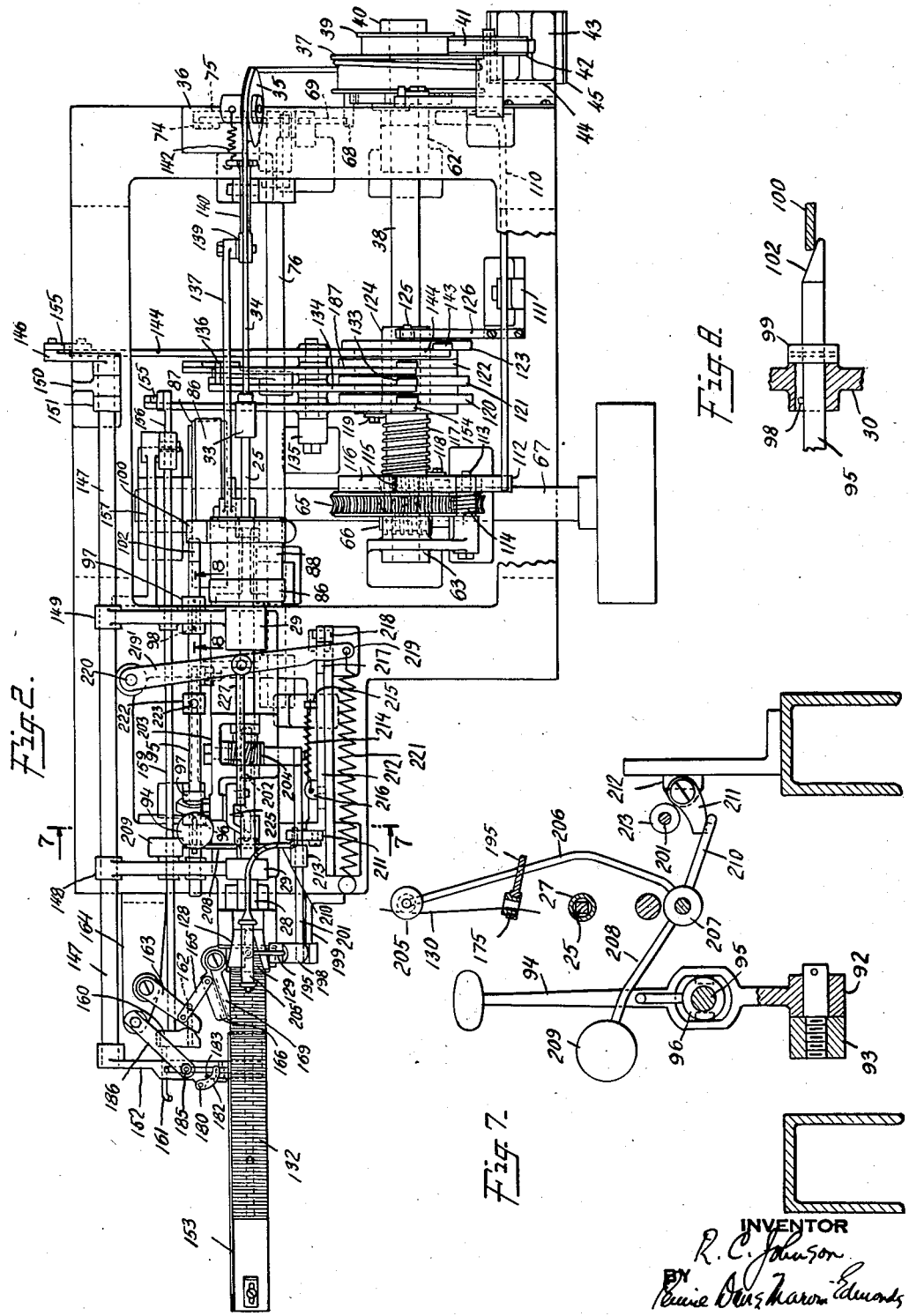

March 24, 1936.    R. C. JOHNSON    2,035,268
TEXTILE MANUFACTURE
Filed May 19, 1934    7 Sheets-Sheet 3
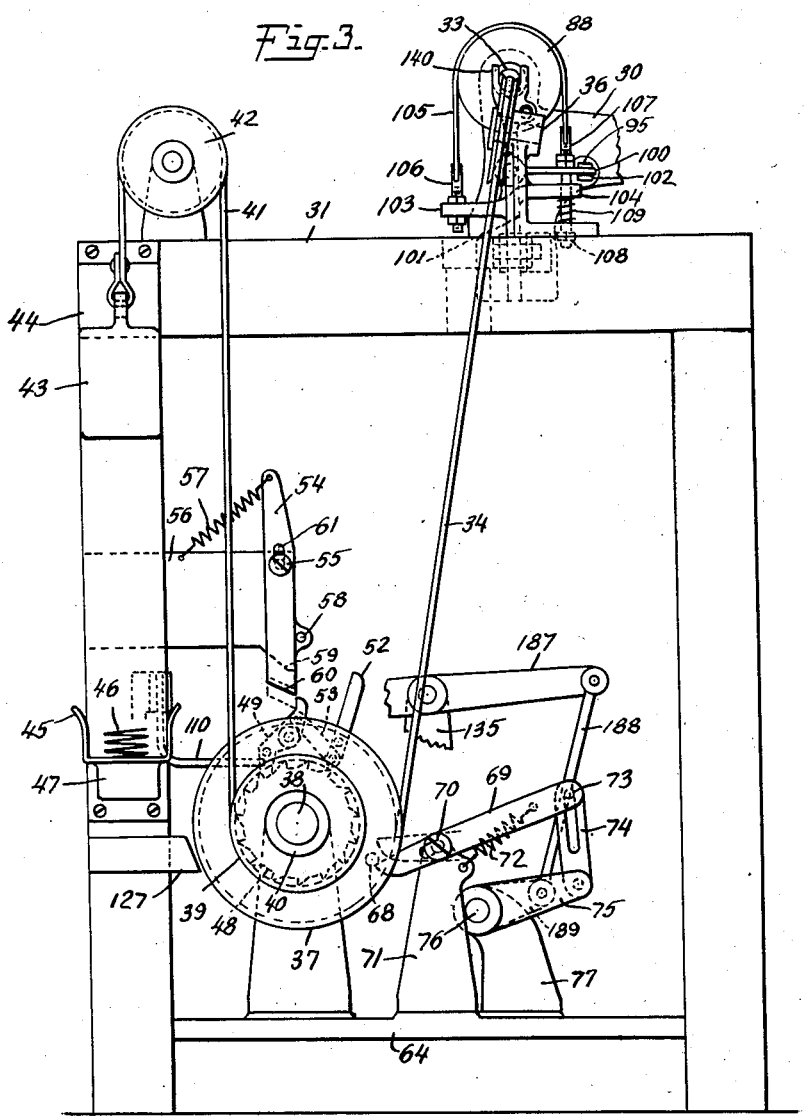
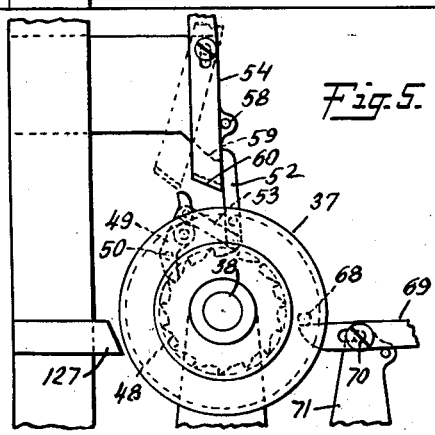
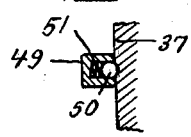
INVENTOR
R. C. Johnson
BY
Pennie, Davis, Marvin, Edmonds
ATTORNEYS

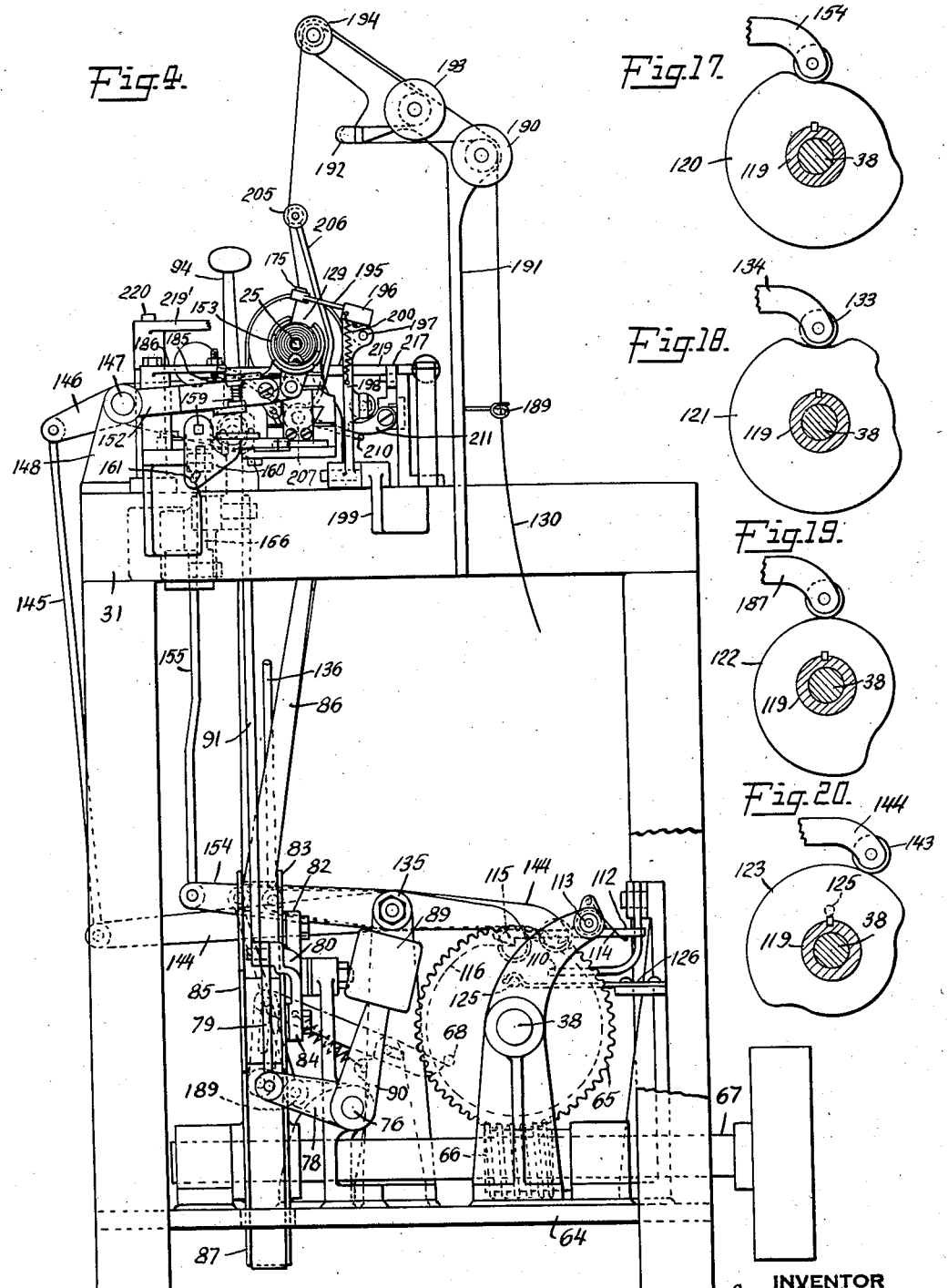

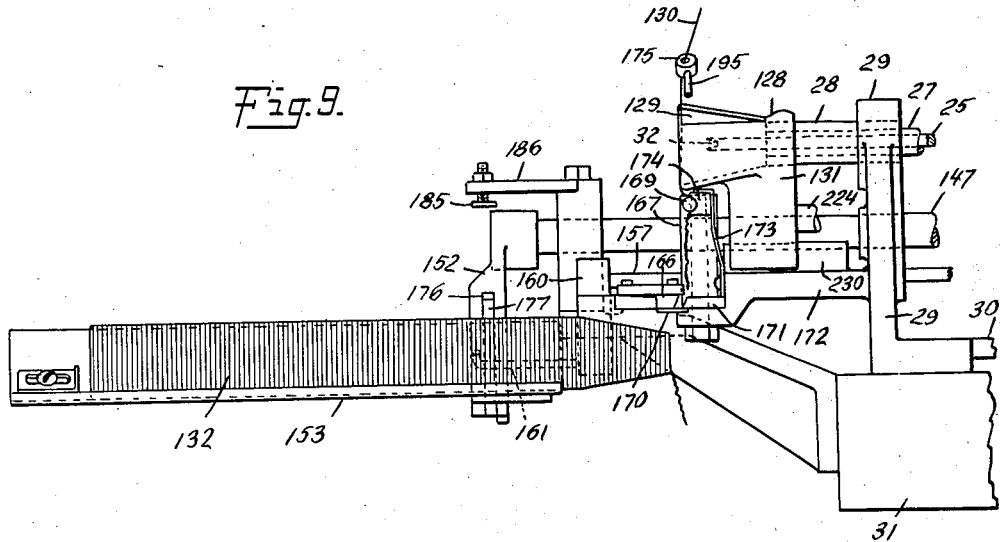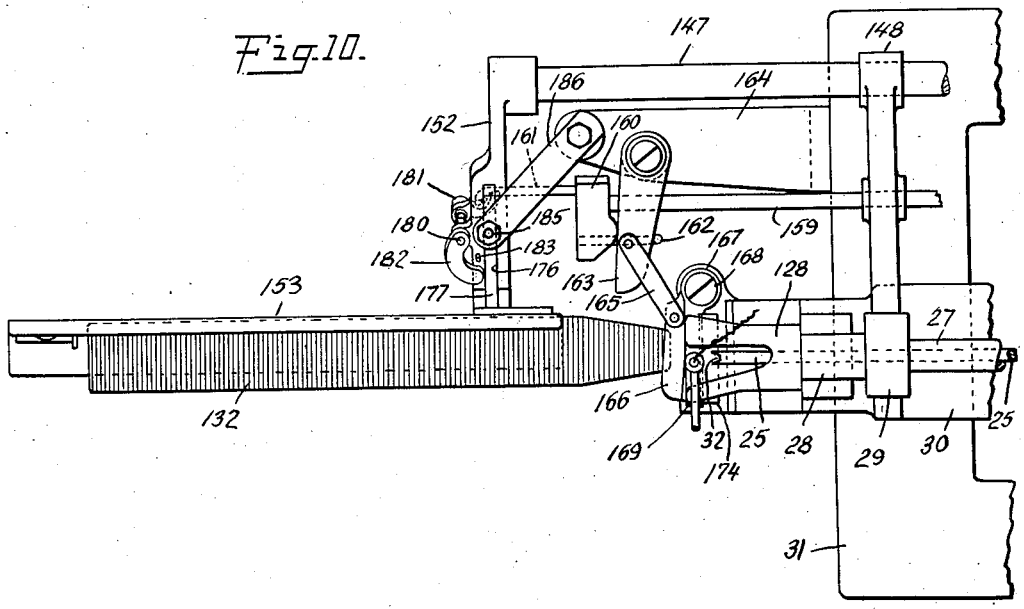

March 24, 1936.   R. C. JOHNSON   2,035,268
TEXTILE MANUFACTURE
Filed May 19, 1934   7 Sheets-Sheet 6
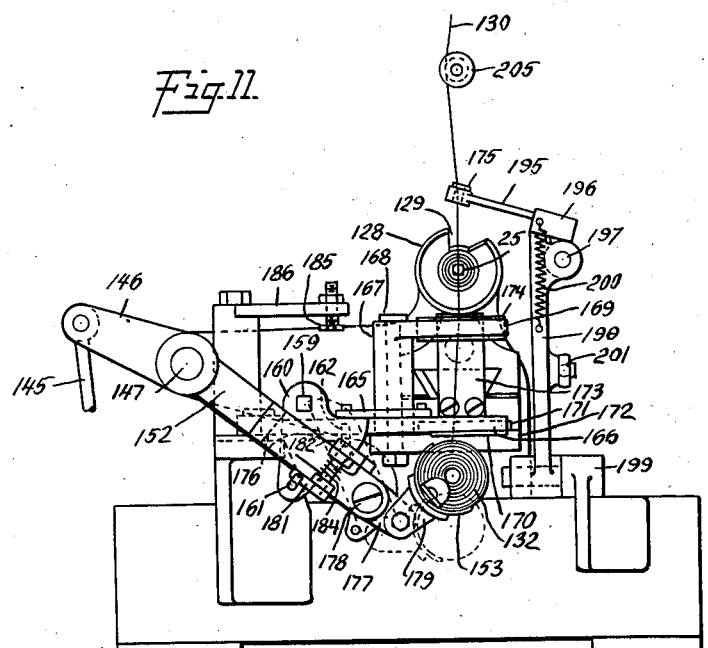
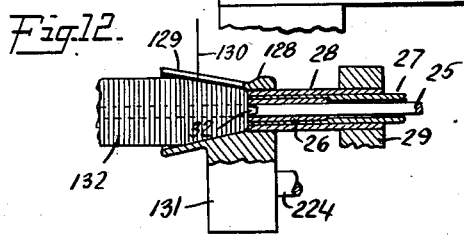
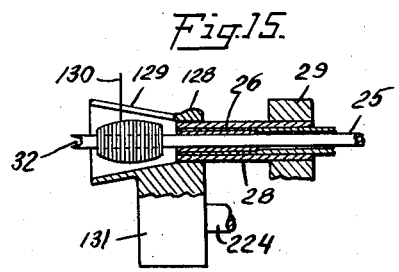
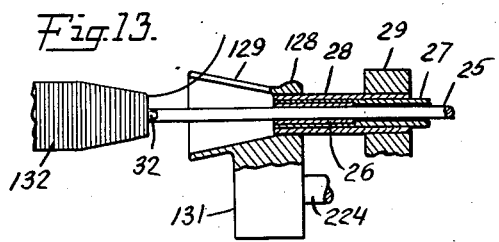
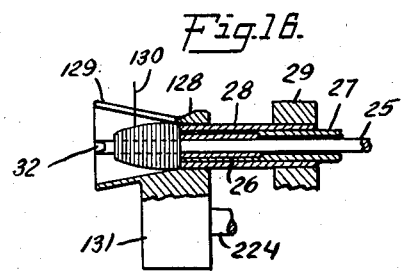
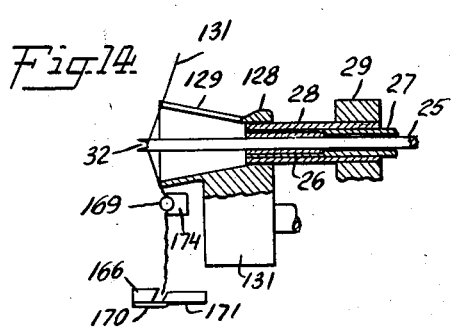
INVENTOR
R. C. Johnson
BY
ATTORNEYS Patented Mar. 24, 1936

2,035,268

UNITED STATES PATENT OFFICE 2,035,268

TEXTILE MANUFACTURE

Ray C. Johnson, Fort Hunter, N. Y., assignor to Mohawk Carpet Mills, Inc., Amsterdam, N. Y., a corporation of New York Application May 19, 1934, Serial No. 726,459

39 Claims. (Cl. 242—27)

The invention relates to machines for winding yarn or thread and is concerned more particularly with a novel fully automatic machine for producing hollow center cops to be used in loom shuttles to supply weft thread in the weaving of fabrics, such as pile fabrics used as floor coverings.

Cop winding machines as now commonly constructed require the attention of an operator who starts the winding operation and at its completion removes the finished cop from the machine. The machines include a rotating spindle on which the yarn is to be wound and this spindle projects through a cop winding head with the free end of the spindle supported by a bracket fixed to a sliding rod. The yarn is led from a supply through a tension mechanism to a traversing guide and to start the winding of a cop, the operator wraps the yarn a few times around the spindle and then starts the machine. As the spindle rotates, the yarn is drawn from the supply and builds up on the spindle, and the yarn mass thus produced contacts with the winding head and, as the mass increases in size, the spindle is moved outwardly from the head. Resistance to the movement of the spindle is provided by a weight which is attached to the rod carrying the supporting bracket for the spindle and is raised as the rod advances, this resistance causing the yarn to be wound into a tight mass.

When the cop being wound on such a machine reaches the selected length, a stop mechanism is actuated and stops further rotation of the spindle. The operator then removes the bracket from the outer end of the spindle and strips or removes the cop from the spindle by hand, severing the thread wound thereon from the supply. The bracket and rod are then restored to their original positions adjacent the winding head, the thread is again caught on the spindle by the operator, and the winding operation is started again.

The cost of production of cops on machines of the type described constitutes a considerable item of expense in fabric production because the output of the winding machines is limited by a number of factors as, for example, the speed of rotation of the spindle, the size and kind of yarn being wound, and the length of the cops being made, and in addition, it is necessary to have one operator supervising each group or from 18 to 20 spindles. The number of spindles that can be attended by an operator depends on the fatigue limit of the operator and is also determined by the necessity, for economic reasons, of having the spindles in as nearly continuous operation as possible. Thus, it is better to employ extra operators than to have spindles idle and awaiting stripping and restarting of the winding operation. The result of all these factors is that cop production on such machines varies from 12 to 19 cops per hour and in a mill containing a large number of looms, the winding department includes many winding machines.

The present invention is directed to the provision of a fully automatic machine for the winding of cops which requires no attention other than the maintenance of a supply of yarn to be wound and the occasional removal of the finished cops. The machine produces hollow cops at a rapid output rate because the removal of the finished cops and the restarting of the winding operation is not dependent upon the attention of the operator but is carried on automatically and with a minimum amount of idle time for the machines.

The cops produced on the new machine are also superior to those produced on present machines because a loom shuttle can, on the average, be threaded with yarn drawn from a cop produced on the new machine more rapidly than with yarn from a cop wound on former machines. The reason for this is that in threading the shuttle, the yarn is drawn from the interior of the cop and through the shuttle trap. With cops produced on the new machine, the end of the yarn at the inside of the cop always projects out of the hole through the cop in position to be grasped quickly by the weaver, while with cops produced on former machines, the inner end of the yarn frequently lies inside the yarn mass and has to be fished out by the weaver with considerable delay.

The machine of the present invention includes a spindle, a winding head, thread tensioning and traversing mechanism, and a stop motion which stops the winding operation in case the thread breaks. In addition, the machine includes a number of different devices for automatically performing the operations of starting the winding, stripping the cop from the spindle, and severing the yarn between the cop and the supply.

For a better understanding of the invention, reference may be had to the accompanying drawings, in which Figure 1 is a front elevation of a machine embodying the invention;

Figure 2 is a plan view of the machine;

Figure 3 is a view of the machine from one end;

Figure 4 is a view from the opposite end;

Figure 5 is an end view of a detail;

Figure 6 is a sectional view of a detail;

Figure 7 is a partial sectional view on the line 7—7 of Figure 2;

Figure 8 is a sectional view of a detail;

Figures 9 and 10 are side and plan views, respectively, of a portion of the winding mechanism;

Figure 11 is a partial end view looking toward the winding head;

Figures 12 to 16, inclusive, are sectional views through the winding head showing the parts in different relative positions;

Figures 17 to 20, inclusive, are face views of cams used in the machine; and

Figure 21:
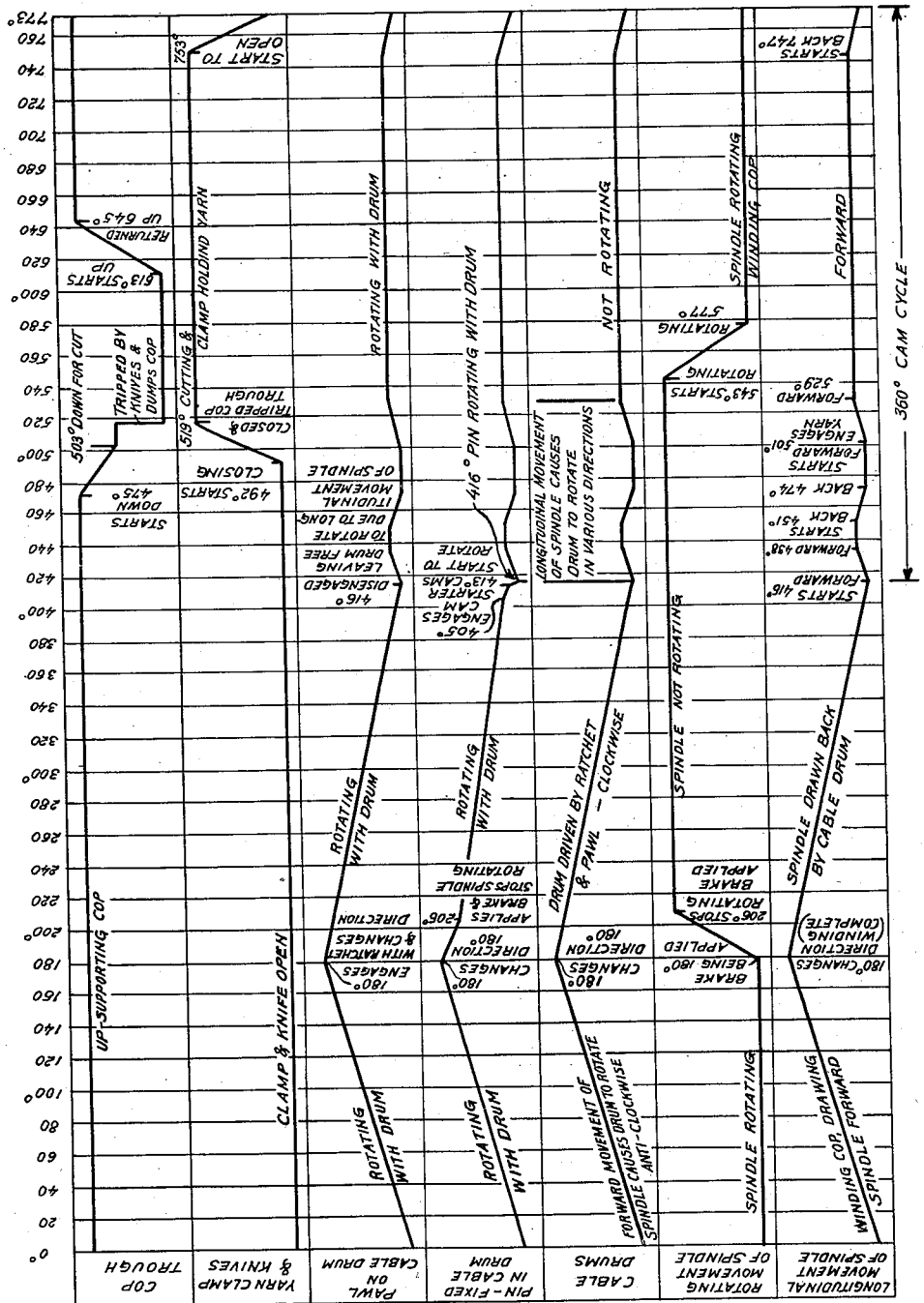

Figure 21 is a chart illustrating the operating times of the various elements in a full cycle of operations.

The machine disclosed in the drawings includes a winding spindle in alignment with a winding head and movable both endwise and rotationally. This spindle is provided with a slot in its free end for holding yarn from a supply, so that on rotation of the spindle, the yarn will be wound thereon. In the construction illustrated, the spindle is advanced to receive the yarn in the slot, and the spindle is then rotated to cause the thread to be wound on the spindle. When the winding operation has proceeded for a short time, the spindle moves backward into the head and the yarn mass being built up comes into contact with the head. As the winding proceeds, the building up of the mass forces the spindle outwardly relative to the head, and this movement is resisted by suitable means so that the yarn mass is made compact. When a cop of the desired length has been wound, the rotational movement of the spindle is stopped and it is moved backward through the head to strip the cop from it. The cop so released from the spindle is supported in a movable trough, and the yarn leading from the cop to the supply is then engaged by a holding device and severed between the cop and the device. The trough is then moved to dump the cop, and while the device continues to hold the yarn, the spindle advances until the yarn enters the slot, and the cycle of operations is repeated.

In the drawings, the machine illustrated comprises a winding spindle 25 of square section, this spindle being mounted in bearings 26 having openings of square shape to permit longitudinal movement of the spindle. The bearings are pressed into the ends of a driving tube 27 and the latter is free to rotate in bearings 28 in standards 29 arising from a bracket 30 supported on a frame structure 31. At one end, the spindle has a slot 32 for receiving the yarn and the other end of the spindle projects out of the supporting tube and is connected by a swiveling connector 33 to a cable 34. The cable passes around a grooved pulley 35 pivoted for rotation in a standard 36 mounted on the frame structure 31 and its free end is attached to a drum 37 mounted for free rotation on a shaft 38 supported in suitable bearings in the framework of the machine. A second drum 39 mounted for free rotation on the shaft 38 is secured face to face to the drum 37, the two drums being held in place on the shaft by a collar 40 at the end of the shaft.

A flexible connector, such as a strap 41, is connected at one end to the drum 39 and passes upward therefrom and over a pulley 42 pivoted in suitable standards on the frame structure 31. The free end of the strap 41 is attached to a weight 43 which is guided for up and down movement in guides 44 attached to the frame structure and terminating at their lower ends in ears 45 which guide the weight so that at the end of its downward travel, it comes to rest gently on a spring 46 in a support 47.

Figure 1:
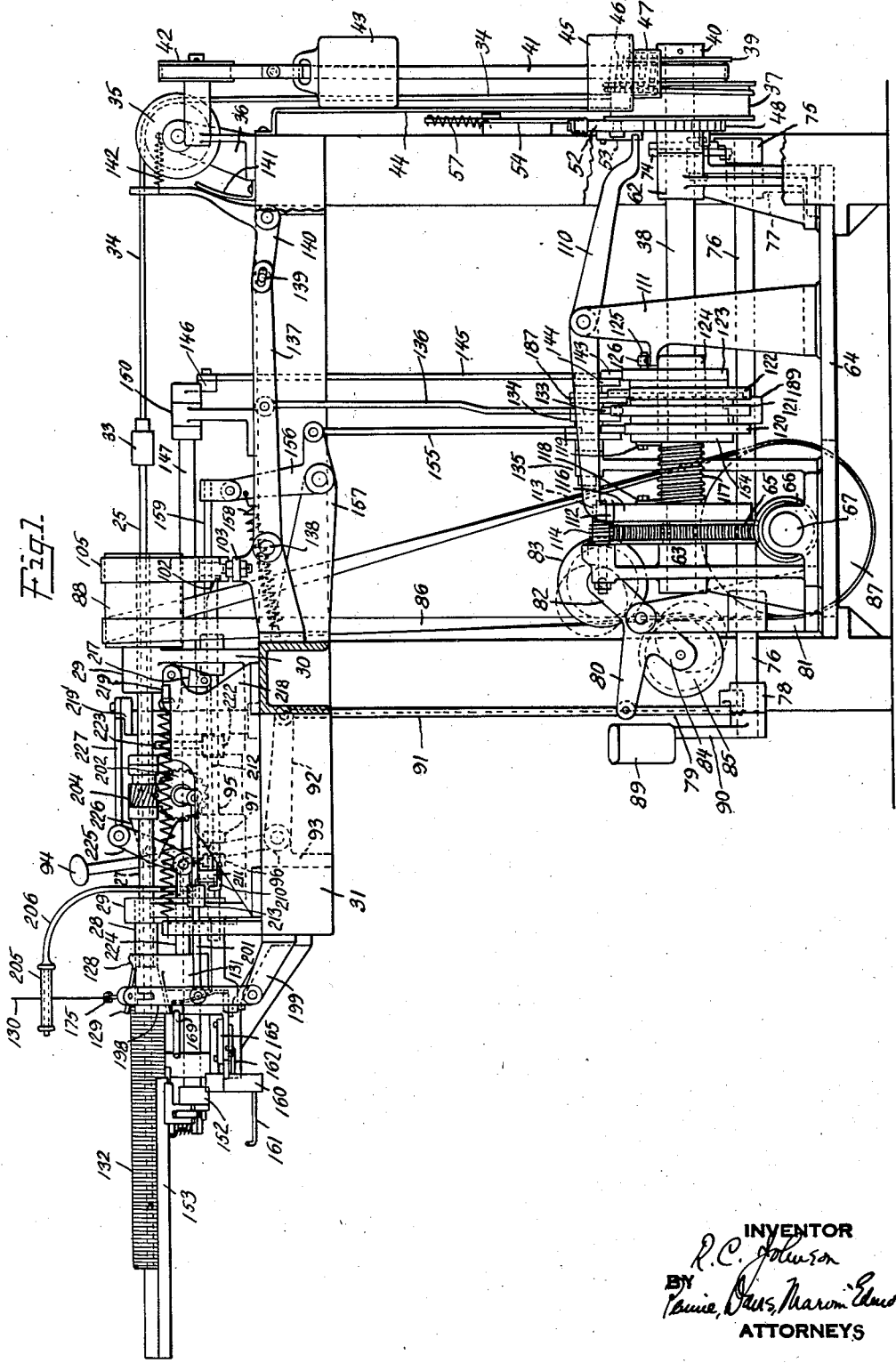

During the winding operation, the spindle moves from right to left, as the machine is viewed in Figure 1, and when the spindle is in its extreme position to the right, the cable 34 is wound on drum 37, and the weight 43 rests on spring 46. As the winding operation proceeds, the spindle moves to the left and unwinds the cable 34 from its drum 37. At the same time, strap 41 is wound upon its drum 39 and thereby raises weight 43 to the position shown in Figure 3. The weight thus resists the advance movement of the spindle and causes the cop to be wound tightly. When the cop has reached a predetermined length, the winding operation is stopped and the spindle is withdrawn from the cop. This movement of the spindle is accomplished by rotating the drums 37 and 39 in a clockwise direction (Fig. 3) so that they draw back the spindle and lower the weight.

The shaft 38 on which the drums are mounted rotates continuously in the clockwise direction and the drawing back of the spindle is effected by connecting the drums positively to the shaft. For this purpose, a ratchet 48 is mounted fast on the shaft, and on the face of the drum 37 adjacent the ratchet is pivoted a pawl 49, the pawl being normally held out of engagement with the ratchet by means of a ball 50 lying in a bore in the pawl and forced outwardly to seat in a cup-shaped depression in the face of the drum 37 by a spring 51. Pivoted on the face of the drum 37 near the pawl is a lever 52 which is connected by a link 53 to the tail of the pawl.

The pawl which is normally out of contact with the ratchet is moved into engagement with the teeth when the cop has reached the predetermined length, and this movement of the pawl is accomplished by means of a lever 54 pivotally mounted at 55 in a bracket 56 mounted on any suitable part of the machine. A spring 57 attached to the upper end of lever 54 and to the bracket tends to maintain the lower end of the lever against a stop pin 58 in the bracket, and as the drum 37 rotates counterclockwise in the winding operation, it carries the pawl 44 to a position in which its tail contacts with the lower end of the lever. The lever is swung on its pivot to a sufficient extent to permit the tail of the pawl to pass by the lower end of the lever, and as this is occurring, the lever 52 on the drum engages the projection 59 on the lower end of bracket 56. As the rotation of the drum continues, the engagement of lever 52 with projection 59 swings the lever on its pivot, and the lever thereupon swings pawl 49 into engagement with the teeth of the ratchet 48. As the lever 54 is freed from the tail of the pawl, it is swung by its spring 57 and its lower end strikes the end of lever 52, and this causes pawl 49 to be driven into tight engagement with the ratchet teeth. The drums are then connected positively to the continuously rotating shaft 38 and begin to rotate clockwise, pulling back the winding spindle 25 and lowering the weight 43. As the drums rotate, the tail of pawl 49 moves along an inclined surface 60 at the lower end of lever 54 and raises the lever so that the pawl may pass beyond it. The rising movement of the lever is permitted by reason of its slot mounting 61 on its pivot 55.

The shaft 38 is journaled in suitable bearings in brackets 62, 63 on the sub-frame structure 64 attached to the standards supporting the frame structure 31. Adjacent the bracket 63, the shaft carries a worm wheel 65 which is driven by a worm 66 on the main drive shaft 67 of the machine. The main drive shaft is driven in any suitable manner, as by a motor, or a belt from the main drive shaft of the mill.

The rotational movement of the spindle is automatically stopped just after the withdrawal of the spindle from the finished cop is begun, and for this purpose, the drum 37 is provided with a pin 68 which, at the proper instant in the clockwise rotation of the drum, comes into contact with the end of a lever 69 having a slotted mounting on a pin 70 in a standard 71. The lever is maintained normally in substantially horizontal position by means of a spring 72 attached to the lever and to standard 71, and as one end of the lever is engaged by the pin 68 and forced downwardly, its other end rises. The rising end of the lever is provided with a pin 73 which lies within a slot in a link 74 pivotally connected to an arm 75 fast on a shaft 76 journaled in suitable brackets 77. When the pin 73 reaches the end of the slot in link 74, further swinging movement of lever 69 results in a counterclockwise movement of shaft 76 (Fig. 3).

The shaft 76 carries a crank 78 (Fig. 4) which is connected by a link 79 to one arm of a bell crank 80 pivotally mounted in a bracket 81 on the sub-base 64. In the other arm 82 of the bell crank is pivotally mounted a belt tightening pulley 83, and the arm 82 has an extension 84 beyond the pivot pin of the bell crank in which is pivotally mounted a belt tightening pulley 85. Passing between pulleys 83 and 84 is the driving belt 86 for the spindle, this belt passing around a pulley 87 on the main drive shaft 67 and also around a pulley 88 on the driving tube 27 of the spindle. The bell crank 80 normally occupies one or the other of two positions, and in one position, the pulleys 83 and 85 permit the belt 86 to pass freely between them. The belt is normally slack so that when it is not acted on by pulleys 83 and 85, it is not effective to drive the spindle and when the shaft 76 is rocked in one direction by lever 69 and its associated parts, it swings the bell crank 80 to a position in which the pulleys 83 and 85 are free of the belt and the spindle ceases to rotate. When shaft 76 is rocked in the opposite direction, pulleys 83 and 85 take up the slack in the belt and make it effective as a drive means for the spindle. The shaft 76 tends to remain in one or the other of the two positions mentioned under the influence of the weight 89 mounted above the shaft on a crank 90 fast on the shaft.

As soon as the drive means for the spindle is rendered ineffective, the rotation of the spindle must be stopped at once and this is accomplished by means of a brake applied to the driving pulley 88 and controlled by bell crank 80. One arm of the bell crank 80 is connected by a link 91 to one arm of a bell crank 92 pivoted on a bracket 93 on the frame structure 31. The other arm of bell crank 92 terminates in a hand lever 94 by which the driving means of the machine may be manually controlled when desired.

The lever 94 has an opening through which extends a rod 95 carrying collars 96 and 97 on either side of the lever (Fig. 7). The rod is mounted for endwise movement in bearings 30 on the main bracket 31 and it carries a pin 98 which enters a slot in one bearing and prevents the rod from rotating (Fig. 8), and also carries a collar 99 engageable with one of the bearings to limit the movement of the rod in one direction. In its movement in one direction, the rod passes under and raises a lever 100 (Fig. 3) pivotally mounted in a bracket 101 on the structure 31, and in another position, the rod lies free of the lever so that the latter may drop. To facilitate its return movement under the lever to raise the latter, the rod is provided with a wedge-shaped end 102.

The bracket 101 is provided with ears 103 and 104 projecting from opposite sides thereof, and a brake band 105 extending around the spindle drive tube pulley 88 is attached at one end to ear 103 by a suitable threaded connection 106. At its other end, the band is attached to a threaded connection 107 which passes through a slot in the arm 100 and through an opening in the ear 104. On the end of the threaded connection 107 are nuts 108 providing an adjustable abutment for a spring 109 which encircles the connection and bears against the under surface of ear 104. This spring tends to hold the brake band against the pulley and the force of the spring so applied can be adjusted by means of the nuts 108.

When the spindle begins its retractile movement to strip the cop from it, the pin 68 on drum 37 starts to rock lever 69. After a short interval, the lever rocks the shaft 76 clockwise (Fig. 3) and this causes bellcrank 80 to move counterclockwise (Fig. 1). Movement of bellcrank 80 throws the belt tightening pulleys away from the belt and also causes lever 94 to be moved clockwise (Fig. 1). This movement of the lever causes rod 95 to move endwise and pass from beneath the lever 100, permitting the latter to move downward. The spring 109 is now free to apply the brake to the spindle drive tube pulley and the pulley stops, stopping rotation of the spindle. The machine can be stopped at any time during its operation by a similar movement of lever 94 made by the operator.

As the retractile movement of the spindle proceeds, the drum 37 continues its clockwise rotation until the pin 68 on the drum engages one end of lever 110 and moves that lever to bring into operation a number of cams which actuate and control the parts of the machine performing the other functions. The lever 110 is pivotally mounted on a standard 111 on the sub-frame structure 64, and when the lever is rocked by pin 68, one end of the lever moves down into contact with a lever 112 which is pivoted at 113 on a bracket on structure 64 and is acted on by a spring 114 which opposes rocking of lever 112 by lever 110. One end of lever 112 is provided with a tooth 115 receivable in a notch in the periphery of a disc 116 loosely mounted on the shaft 38, and when the tooth is in the notch, the disc is held in fixed position.

Encircling the shaft 38 is a torsion spring 117, one end of which is secured by a bolt 118 to the face of disc 116. The other end of the spring is connected to the face of a sleeve 119 loosely mounted on shaft 38 and on this sleeve are mounted four cams 120, 121, 122, and 123, the cams being maintained in position on the disc by a collar 124 fast on the shaft. The spring 117 is wound in a direction opposite to the direction of rotation of the shaft 38 and tends to grip the shaft and cause the cams to rotate with it. The spring is prevented from performing this function, in part by tooth 115 on lever 112 seated in the notch in disc 116, and in part by a pin 125 on cam 123 which is receivable in a channel in a leaf spring 126 secured to a convenient part of the structure. As long as the tooth 115 is seated in its notch in disc 116 and pin 125 lies in the channel in spring 126, the spring 117 cannot grip the shaft 38 and the cams remain stationary. When the cams are to be brought into operation, lever 110 is rocked to free the tooth 115 from its notch and the spring 117 then causes disc 116 to rotate to an extent to permit the spring to grip the shaft and thereby connect the cam sleeve operatively to the shaft. The turning force transmitted through the spring 117 to the cam sleeve is sufficient to cause the pin 125 to ride out of the channel in spring 126, so that upon operation of lever 110, the cams are connected to shaft 38 and begin to rotate. The rotation continues through 360°, whereupon tooth 115 enters its notch and holds the cam against further rotation until the tooth is again removed from the notch by movement of lever 112.

As soon as the cams are brought into operation, the drums 37 and 39 should be freed from shaft 38, and to effect this result, an arm 127 is mounted on the frame structure in a position to be engaged by the lever 52 on 37 as the latter rotates. The engagement of lever 52 with arm 127 causes the lever to swing and the lever frees pawl 49 from the teeth of ratchet 48, whereupon the connection between the drums and the shaft is broken.

The cams give the spindle a series of movements necessary to effect ejection of the cop from the winding head and to cause the spindle to engage and pick up the thread at the beginning of the winding of a new cop. The cams also operate the means by which the strand is held between the finished cop and the supply and is severed between the cop and the holding means.

The winding head 128 (Fig. 12) has a generally conical inner surface and it is provided with a lengthwise opening 129 through which the thread 130 may pass and an axial opening into which extends the driving tube 28. The winding head is mounted on a standard 131 on the frame structure 31, and the head illustrated is of conventional construction, being representative of a number of commonly used winding heads which can be employed in the present machine. During the winding operation, the end of the cop is in contact with the inner surface of the head. When the spindle 25 has been retracted to the full extent by the action of the cable drums at the end of the winding of a cop, the spindle occupies the position shown in Figure 12 with its slotted end lying within the end of the drive tube 28. The cop 132 still remains with its end in the winding head and the spindle must be advanced in order to force the cop out of the head.

This movement of the spindle is represented in Fig. 13 and it is effected by means of the cam 121. Bearing on the surface of the cam is a roller 133 mounted in one end of a lever 134 pivoted on a pin in a standard 135. The other end of the lever is connected by a rod 136 to a lever 137, one end of which is pivoted on the frame structure 31 at 138. The other end of lever 137 is connected by a pin and slot connection 139 to one arm of a bell crank 140 pivotally mounted on the frame structure. The other arm of bell crank 140 has an opening through which the cable 134 passes, this opening, however, being too small to permit the passage of the connector 33. When the spindle is in its extreme retracted position, the connector 33 is in contact with one arm of bell crank 140 and when the bell crank is rocked counterclockwise (Fig. 1) by cam 121 and its associated parts, the bell crank forces the spindle forward to the position shown in Figure 13 and this movement of the spindle pushes the cop out of the winding head.

As soon as the ejection of the cop from the winding head is completed, the spindle is moved back into its drive tube and this movement of the spindle is effected by the weight 43 connected to drum 39. The forward movement of the spindle produced by cam 121 causes the weight to be raised and cam 121 is so shaped that at the proper time in its rotation, it permits the weight to draw the spindle back, rocking the bell crank 140 clockwise. This movement of the bell crank brings it into contact with a leaf spring 141 mounted on the frame structure and constituting a cushioning stop and the bell crank is normally held against spring 141 by a spring 142 connected to the arm of the bell crank and to a fixed part of the structure. The pin and slot connection between the bell crank and lever 137 prevents minor movements of the bell crank from being transmitted to the cam through the lever 137.

The next operation in the cycle is the lowering of the cop to bring the thread into position to be held and severed from the supply and this operation is controlled by the cam 123. A roller 143 mounted on one end of a lever 144 rests on the surface of cam 123, the lever being pivotally mounted on the pin in standard 135. The other end of lever 144 is connected by a rod 145 to an arm 146 fast on a shaft 147 in bearings in brackets 148, 149, and 150 on the structure 31. The arm 146 is mounted on one end of the shaft on one side of the bearing in bracket 150 and the shaft carries a collar 151 on the other side of the bearing, the shaft thus being kept from endwise movement.

An arm 152 fast on shaft 147 supports at its free end a trough 153, and during the winding operation, this trough lies beneath the cop on the spindle and when the cop is stripped from the spindle by the backward movement of the latter and is then forced out of the winding head by the next forward movement of the spindle, the cop is supported by the trough. The weight of the cop, the trough, and the trough supporting arm acts through the connection to maintain the roller in the end of lever 144 in contact with the surface of cam 123, and the cam is so shaped that when the cop is free from the head and received by the trough, the latter is lowered to bring the cop out of alignment with the spindle and into position for the severing of the thread from the supply.

The severing operation is performed by the cam 120. A roller in one end of a lever 154 pivotally mounted on bracket 135 bears against the surface of this cam, and the other end of the lever is connected by a rod 155 to one arm of a bell crank 156 pivoted on a bracket 157 attached to the frame structure 31. The other arm of the bell crank which is acted on by a spring 158 attached to the frame structure, is connected to a rod 159 supported for longitudinal movement in suitable bearings in brackets 148 and 149. At one end, the rod 159 carries an operating head 160 from one side of which extends a rod 161 lying beneath the arm 152 supporting the cop trough and serving as a stop for the downward motion of that arm. Projecting from the opposite side of the head is a rod 162 on which rests the end of an arm 163. The rod 162 has an upward projection lying at one side of the arm 163 and the other side of the arm lies in contact with a curved surface on the adjacent side of the head 160. The arm 163 is pivotally mounted on a bracket 164 on the supporting structure 31 and the arm is connected by a link 165 to an arm 166 extending from a sleeve 167 pivotally mounted on a pin 168 and provided with a second arm 169.

On the under side of arm 166 is mounted a knife blade 170 which cooperates with a knife blade 171 on a bracket 172 on main bracket 29. A leaf spring 173 attached to bracket 172 rises therefrom and carries at its upper end a block 174 which has a concave depression adapted to receive the arm 169 and cooperate therewith to clamp and hold the strand.

The movement imparted to the rod 159 by cam 120 and the connections described causes the operating head 160 to swing lever 163 clockwise about its pivot. This movement of the lever causes the sleeve 167 to swing and the thread is clamped between the arm 169 and block 174 and severed by the cooperating knives 170 and 171. The angular relation between arms 166 and 169 is such that in the rotation of the sleeve 167, the thread is first clamped and then severed. When the rod 159 returns to its normal position, the arm 169 and movable knifeblade 170 are sufficiently removed from their cooperating parts, namely, block 174 and fixed knife 171, respectively, so that the strand extending from the cop to the eye 175 of the traversing mechanism will be received in the clamping and cutting devices. The return movement of the rod 159 to normal position is effected by the spring 158, the cam 120 acting only to move the arm so as to cause the clamping and severing devices to function.

During the time that the clamping and severing operations are taking place, the cop trough occupies the position shown in full lines in Fig. 11, in which trough supporting arm 152 rests upon the stop 161 in the operating head 160. Further downward movement of the trough is necessary to effect ejection of the cop, and for this purpose, the supporting arm 152 is provided with a slot 176 at its outer end and in this slot is pivotally mounted a bell crank 177 on a pin 178. One arm 179 of the bell crank carries the trough 153 at its upper end and the other arm normally lies within the slot. A pin 180 mounted in ears on one side of the arm 152 carries an arm 181 at its lower end and an arm 182 at its upper end, the arm 182 being normally held against a stop pin 183 on arm 152 by a spring 184 encircling the pin 181. When the arm 182 is in contact with the pin, it overlies the slot and prevents swinging of the bell crank on its pivot. When the rod 159 moves rearwardly to cause the clamping and severing devices to function, the stop rod 161 slides under the arm 152 and a vertical projection on the end of the rod contacts with the lower arm 181 on pin 180 and swings the arm and pin to a position in which the upper arm 182 on the pin uncovers the top of slot 176. The weight of the trough containing the cop then causes the bell crank 179 to swing on its pivot to the dotted line position shown in Fig. 11, and the cop then falls out of the trough.

On the return movement of the rod 159, the stop rod 161 moves away from arm 181 but the bell crank 179 supporting the trough remains in its tilted position until the arm 152 is raised. During the rising movement of the lever, the arm of the bell crank which normally lies within the slot contacts with a stop pin 185 in an arm 186 attached to bracket 164. The engagement of the arm of the bell crank with the stop pin causes the bell crank to swing, and as the lever 152 rises, the arm enters the slot 176 and is held in position therein by arm 182 moving into contact with its stop pin 183.

Upon dumping of the cop, the spindle must engage and pick up the yarn so that the winding of the next cop can be started, and this is accomplished as follows. Just prior to the dumping of the cop from the trough, the spindle is started forward by its cam 121 causing bell crank 140 to be rocked clockwise to engage the cable connector 33 to move it forward. As the spindle advances, its slotted end engages the yarn between the eye 175 of the traversing mechanism and the clamping device. As soon as the end of the spindle comes in contact with the yarn, the spindle is started rotating to pick up the yarn and this is done by cam 122.

A roller supported in one end of lever 187 bears against the surface of cam 122, the lever being pivotally mounted in a standard 135. The lever is connected by a link 188 to an arm 189 fast on shaft 76 and when lever 188 is rocked by cam 122, it rocks shaft 76. This causes the weight 89 to be thrown past dead center and arm 78 fast on the shaft pulls down on the link 79 and swings bell crank 80 to a position in which the belt-tightening pulleys 83 and 85 carried thereby engage and tighten the belt 86, so that power is transmitted from the drive pulley 87 on main shaft 67 to the pulley 88 on the spindle drive tube 28.

The thread 130 is supplied to the spindle from any suitable source of supply and passes through a guide eyelet 189 and between tension plates 190 mounted on a standard 191 rising from the frame structure 31. The thread then passes around a grooved eyelet 192 and between tension plates 193 and 194 on bracket 191, all these tensioning devices being of conventional construction. On leaving the last tensioning device, the thread passes through the eye 175 in one end of an arm 195 mounted on an arm 196 pivoted at 197 on a traversing arm 198 pivotally mounted on a bracket 199 attached to the supporting structure 31. The arm 196 may swing on its pivot 197 but is normally held in one position by a spring 200 attached to arms 196 and 198.

The traversing arm 198 is rocked back and forth to effect a traverse of the thread less than the length of the cop winding head, and this movement is given to the arm by means of a connecting rod 201 attached at one end to a pin on arm 198 and at its other end to a pin eccentrically mounted in the face of a gear free to rotate in bearings in a bracket 203 on the structure 31. The gear 202 meshes with a gear 204 on the driving tube 27 for the spindle, and thus, whenever the spindle is rotating, the traverse arm is oscillated to effect a traverse of the thread being wound.

On breakage of the thread being wound, the machine stops automatically, and for this purpose, the thread passing from the tension plates 194 to guide eye 175 is engaged by a roller 205 which forces the thread out of its normal path (Fig. 7). The roller is supported in a rod 206 fixed in a hub 207 mounted for rocking movement on a pin projecting from bracket 148. Also, attached to the hub is a rod 208 carrying a weight 209, the weight tending to rock the hub so as to cause the arm 206 to force roller 205 against the thread. The tension of the thread normally holds the weight in elevated position, but whenever the thread breaks, the weight falls, causing the hub 207 to rock. The hub carries a third rod 210, and when the hub is rocked upon breaking of a thread, the rod 210 engages one end of arm 211 pivoted on a sliding bar 212 and causes the arm to rise into the path of movement of a collar 213 on the rod 201.

The collar 213 may be fixed in different positions along the rod and when the arm 211 is in its normal downward position, the collar 213 moves past it freely. When the arm 211 rises and is engaged by the collar, it serves to connect the rod 201 to the sliding bar 212, and the bar moves to the right (Fig. 2) against the resistance of a spring 214. This spring is attached at one end to a pin 215 on the sliding bar and at its other end to a pin 216 which passes through a slot in the sliding bar and enters an opening in the supporting structure 31. At one end, the sliding bar is attached to one arm of a bell crank 217 mounted in a bracket 218 on the structure 31. The other arm of the bell crank is notched to receive a lever 219 pivotally mounted on the frame structure at 220. The lever is held in contact with the side of the notch in the arm of the bell crank by a spring 221, secured to the end of the lever and to a suitable part of the frame, and when the bell crank 217 is rocked, the lever 219 is released from the notch and is swung by spring 221.

Mounted on the rod 95 at one side of lever 219 is a collar 222 provided with a pin 223 which extends upwardly in the path of the lever 219. When the lever is swung upon breakage of the thread, it strikes pin 223 and moves rod 95. This movement of rod 95 causes bell crank 92 to swing to rock bell crank 80 to move its belt tightening pulleys 83 and 85 out of contact with the belt. The belt then runs loosely and driving of the spindle drive tube thereupon ceases. The movement of the rod 95 also causes it to pass from beneath lever 100 and the lever is then moved down by the brake applying spring 109 and the brake band is applied to the spindle drive pulley 88.

Occasionally the thread breaks in such a manner that one end is wound on the cop before the machine is stopped, and in that situation, it is necessary to move the head backward away from the cop so that the end of the thread on the cop can be reached for tying. This movement of the winding head is accomplished by means of a rod 224 attached at one end to the lower portion of the head and at the other connected to one end of a lever 225 pivoted in a bracket 226. The other end of the lever 225 is connected by a rod 227 to a pin suitably placed on the lever 219' which is attached to lever 219 (Fig. 4). The winding head is movable on guideways 230 (Fig. 9) forming part of the bracket 172 and with the connections described, the movement of the arm 219 occurring upon breaking of the thread causes the cop winding head to move backwardly away from the cop so that the broken end on the cop may be readily reached. When the machine is started again by movement of the starting handle 94, the lever 219 is restored to its position in the notch in the bell crank and the winding head is moved back into contact with the cop.

The sequence of operations of the various parts of the apparatus is illustrated in the chart constituting Fig. 21 and this chart consists of sub-divisions representing graphically the longitudinal and rotational movements of the spindle, the rotation of the cable drums 37 and 39, the action of the pin 68 carried by the drum 37, the operation of the pawl 49 carried by drum 37, the action of the yarn clamp and knives, and the action of the cop trough.

The sub-division of the chart at the bottom illustrates the longitudinal movement of the spindle 25 and begins at the left with the spindle in the position shown in Figure 16. At that stage of the operation, a small mass of thread has been wound on the spindle and the spindle has been moved backward to bring the mass into contact with the winding head 129. From that point on, the continued rotation of the spindle causes the mass to increase in size as the cop is being built up and the contact of the wound thread with the inner surface of the winding head causes the spindle to move outwardly from the head. This movement of the spindle results in rotation of the cable drums and the winding of the cop proceeds until the cable drums have rotated through an arc of 180°, as shown on the chart. At that point, the winding is complete and the spindle is now drawn back through the cop by the take-up of the cable attached to the drum 37. This backward movement of the spindle continues until the drums have rotated through an arc of 236°, and at that point the spindle is wholly withdrawn into its tube and is in the position shown in Figure 12. Further longitudinal movements of the spindle are effected by the cam structure with the cam drum making a complete rotation of 360° to complete the sequence of operations, and during the operation of the cam mechanism, the spindle moves back and forth at different times.

As shown in the chart, the spindle is moved forward while the cams are rotating through an arc of 25°, and this movement of the spindle forces the cop out of the winding head, the spindle moving to the position shown in Figure 13. The spindle remains in that position while the drums continue to rotate through an arc of 13°, whereupon the spindle begins to be drawn back into its tube to the position shown in Figure 12. This movement of the spindle represents a cam movement of 23° and the spindle remains back in the tube until the cams have made a further rotation of 27°. At this point in the cam rotation, the spindle begins to move forward again to engage the thread, engagement taking place when the spindle is in the forward position shown in Figure 14. This forward movement of the spindle represents a cam rotation of 28° and, while the spindle remains in the forward position of Figure 14, it is caused to rotate to wind a small mass of thread thereon as shown in Figure 15. The winding of this mass of thread occurs during a rotation of the cams through an arc of 218°, and at the conclusion of this rotation, the spindle is moved back by the cams to bring the small mass of thread wound thereon into contact with the winding head. This backward movement of the spindle takes place while the cams are rotating through an arc of 26° to complete their revolution.

The sub-division of the chart entitled "Rotating movement of the spindle" discloses that beginning with the spindle in the position shown in Figure 16, the spindle rotates until the cable drums have passed through an arc of 180°. At this point, the stopping of the spindle begins by the slackening of the driving belt and the application of the brake. The stoppage of the spindle occurs during a period in which the cable drums are rotating 26° in the reverse direction, and during the time that the spindle is completing its backward movement into the tube, is discharging the cop from the head, and traveling forward to engage the thread again, the spindle remains at rest rotationally. When the cams have rotated through an arc of 130°, the mechanism for starting the spindle is brought into action and full rotation of the spindle commences at 577° on the chart corresponding to the completion by the cams of rotation through an arc of 164°. Throughout the remainder of the rotation of the cams, the spindle continues to rotate to wind thread thereon and the rotation continues until the cop is completed and the spindle is again stopped by slackening of the belt and application of the brake.

The third sub-division of the chart from the bottom represents rotational movements of the cable drums. As the spindle in the position which it occupies in Figure 16 continues to wind thread, the building up of the mass of thread thereon in contact with the winding head causes the spindle to move forward. This unwinds the cable 34 from drum 37 and, as viewed in Figure 3, the drums rotate counterclockwise through an arc of 180°. At this point, the winding is complete and the drums have been connected to the shaft 38 by the ratchet and pawl. The drums thereupon begin to rotate clockwise to draw the spindle out of the cop and this movement is completed when the drums have rotated clockwise through an arc of 236°. At this point in the rotation of the drums, the spindle comes under control of the cams, and throughout the cam cycle of 360°, the drums have various movements clockwise and counterclockwise depending upon the longitudinal movements of the spindle in both directions, effected by the cams.

The sub-division of the chart entitled "Pin fixed in cable drum" represents the action of pin 68 carried in the surface of the drum 37. During the outward movement of the spindle from the position shown in Figure 16, the cable drums move counterclockwise, as shown in Figure 3, until they have completed travel through an arc of 180° and at this point, the drums are connected to shaft 38 and begin to travel clockwise. When the drums have traveled 26° in the clockwise direction, the pin 68 engages the end of lever 69 and causes that lever through its associated parts to slacken the driving belt and apply the brake. The pin rides by the end of the lever as the rotation of the cable drums continues, and at 225° in the clockwise rotation of the drums, that is, at 405° in the total drum movement, the pin 68 engages the lever 110 and commences to move that lever to cause the cam drum to be clutched to shaft 38. At 413° in the drum movement, the cams are in full rotation. From this point throughout the cam cycle of 360°, the pin rotates with its drum and the drum is moved first in one direction and then the other as the longitudinal movement of the spindle by the cams is carried on.

The sub-division of the chart entitled "Pawl on cable drum" discloses the manner of operation of pawl 49 on drum 37. While the spindle is moving outward during the winding of the cop, the pawl rotates with the drum until the drum has traveled 180° in a counter-clockwise direction. At this point, the pawl is engaged with ratchet 48 and causes the drum to be operatively connected to shaft 38 and driven by the shaft in a clockwise direction. The connection continues until the total movement of the drums in both directions equals 416°, whereupon the pawl is freed from its ratchet and moves with the drum as the latter is rotated by the longitudinal movements of the spindle produced by the cams.

The sub-division of the chart entitled "Yarn clamp and knives" discloses that the clamp and knives are inoperative and in open position throughout the rotational movement of the drums toaling 413°, plus a portion of the cam cycle equal to 79°. At this point in the operation of the machine, the clamp and knives start to close, and when the cams have advanced an additional 27°, the clamp and knives are completely closed and the cop trough is tripped. The clamp continues to hold the yarn until the cams have rotated through 234° and while the clamp is thus holding the thread, the small mass is building up on the cop. At the end of this portion of the cam movement, the clamp and knives start to open and the opening movement is completed simultaneously with the completion of the cam cycle.

The top sub-division of the chart illustrates the operation of the cop trough. This trough is in its upper position throughout the entire rotation of the cable drum during the winding of the cop and the removal of the spindle therefrom. The trough continues up until the cams have rotated through an arc equal to 62°, whereupon the trough starts down, reaching its downward position at 90° of cam travel. At 106° of cam travel, the trough is tripped by the knife mechanism and dumps the cop, the trough remaining down until the cams have passed through an arc of 200°. At this point, the trough starts upward, completing its upward movement when the cams have traveled through an arc of 232°. The trough remains up thereafter throughout the winding of the succeeding cop.

The chart, Fig. 21, represents a cycle 773° and of this amount, 360° represent a complete revolution of the cams, while the remaining 413° correspond to movements of the cable drums, coincidental with endwise movement of the spindle during the winding operation and the retraction of the spindle from the cop. After the first mass of thread is wound on the spindle immediately following the engagement of the spindle with the thread from the supply, the spindle is retracted to bring the thread mass into contact with the interior of the winding head as shown in Fig. 16, and this corresponds to 0° on the chart. From there on, the winding of the cop continues with the spindle moving out of the winding head until the cable drums have moved through an arc of 180° in one direction. The drums now move in the opposite direction through an arc of 236°, whereupon the cams come into action and further movements of the spindles are controlled by the cams. In these movements, the drums rotate first in one direction and then the other until the cam cycle is completed, at which time the first mass of thread has been wound and the spindle has been retracted to bring the mass into contact with the winding head. This completes the cycle of operations.

The machine has been illustrated and described in a form suitable for the production of cops of a single length, but by minor changes, the machine can be used for winding cops of lengths different from that disclosed. The length of the cop produced in any winding operation on the machine is determined by the length of the arc through which the cable drum 37 is moved counter-clockwise before being connected to the shaft

8  2,035,268

38 which is continuously rotating clockwise. The connection of the drum to the shaft is effected by engagement of the pawl-actuating lever 52 with the lever 54 on bracket 56 and, therefore, by shifting the bracket or the position of lever 54 thereon, the actuation of the pawl may be made to occur earlier or later during the winding operation, so that shorter or longer cops may be produced, respectively. For instance, with a shift of the bracket 56 toward the stop 127, the drum is free to rotate counter-clockwise more than 180° and the cop produced is lengthened; with a shift of the bracket away from the stop and around the shaft 38, the free rotation of the drum is reduced below 180° and the cop produced is shortened.

I claim:

1. In a winding machine, the combination of a winding head, a rotary spindle mounted for endwise advancing and retractile movement through said head, the contact with said head of the mass wound on said spindle causing the latter to advance, positive means operable between main winding operations for advancing and retracting said spindle alternately, and means for rotating said spindle.

2. In a winding machine, the combination of a winding head, a rotary spindle mounted for endwise advancing and retractile movement through said head, the contact with said head of the mass wound on said spindle causing the latter to advance, positive means operable to move said spindle to withdraw it from the wound mass, means biasing said spindle toward withdrawn position, and positive means for moving said spindle endwise in the opposite direction, both said positive means operating between main winding operations.

3. In a winding machine, the combination of a winding head, a rotary spindle mounted for endwise advancing and retractile movement through said head, the contact with said head of the mass wound on said spindle causing the latter to advance, positive means operable to move said spindle to withdraw it from the wound mass, means biasing said spindle toward withdrawn position, and positive means for effecting partial endwise movement of said spindle away from said position, both said positive means operating between main winding operations.

4. In a winding machine, the combination of a winding head, a rotary spindle mounted for endwise advancing and retractile movement through said head, the contact with said head of the mass wound on said spindle causing the latter to advance, positive means for moving said spindle endwise to withdraw it from the wound mass thereon, a connector connected to said spindle, a weight connected to said connector and biasing the spindle toward withdrawn position, and positive means for moving said spindle endwise away from said position, both said positive means operating between main winding operations.

5. In a winding machine, the combination of a winding head, a rotary spindle mounted for endwise advancing and retractile movement through said head, the contact with said head of the mass wound on said spindle causing the latter to advance, positive means for both advancing and retracting said spindle, said means operating between main winding operations, means for rotating said spindle, and means for automatically starting and stopping the operation of said rotating means.

6. In a winding machine, the combination of a winding head, a rotary spindle mounted for endwise advancing and retractile movement through said head, the contact with said head of the mass wound on said spindle causing the latter to advance, positive means for both advancing and retracting said spindle, said means operating between main winding operations, means for rotating said spindle, and means for starting and stopping the operation of said rotating means, said starting and stopping means being actuated in accordance with the endwise movements of said spindle.

7. In a winding machine, the combination of a winding head, a rotary spindle mounted for endwise advancing and retractile movement through said head, the contact with said head of the mass wound on said spindle causing the latter to advance, positive means for withdrawing said spindle from the wound mass, said means including a cable and cable drum, said positive means operating between main winding operations, means for rotating said spindle, and means for controlling said spindle rotating means, said control means being actuated by rotation of said drum in one direction to stop the spindle rotating means.

8. In a winding machine, the combination of a winding head, a rotary spindle mounted for endwise advancing and retractile movement through said head, the contact with said head of the mass wound on said spindle causing the latter to advance, positive means for effecting endwise movement of said spindle in one direction to withdraw it from the wound mass, and cam-controlled means for effecting endwise movements of said spindle in both directions, said positive means and cam-controlled means operating between main winding operations.

9. In a winding machine, the combination, of a winding head, a rotary spindle mounted for endwise advancing and retractile movement through said head, the contact with said head of the mass wound on said spindle causing the latter to advance, positive means for moving said spindle endwise in one direction to withdraw it from the wound mass, and cam-controlled means for effecting endwise movements of said spindle in both directions, said cam-controlled means being brought into operation by said positive means and both said means operating between main winding operations.

10. In a winding machine, the combination of a winding head, a rotary spindle mounted for endwise advancing and retractile movement through said head, the contact with said head of the mass wound on said spindle causing the latter to advance, positive means for moving said spindle endwise in one direction to withdraw it from the wound mass, means for effecting partial endwise movements of said spindle in both directions, said means including a cam, and means actuated by said positive means for effecting rotation of said cam, said positive means and spindle moving means operating between main winding operations.

11. In a winding machine, the combination of a winding head, a rotary spindle mounted for endwise advancing and retracticle movement through said head, the contact with said head of the mass wound on said spindle causing the latter to advance, positive means for withdrawing said spindle from the wound mass, said means operating between main winding operations, means for rotating said spindle, cam means for controlling said rotating means, and means actuated by said positive means for rendering said cam means operative.

12. In a winding machine, the combination of a winding head, a rotary spindle mounted for endwise advancing and retractile movement through said head, the contact with said head of the mass wound on said spindle causing the latter to advance, positive means for moving said spindle endwise in one direction to withdraw it from the wound mass, separate means for effecting partial endwise movements of said spindle in both directions, and means for rotating said spindle, the operation of said rotating means and said latter means operating between main winding operations being controlled by said means for effecting endwise spindle movement.

13. In a machine for winding a strand drawn from a supply into a mass, the combination of a winding head, a rotary spindle mounted for endwise advancing and retractile movement through said head, the contact with said head of the mass wound on said spindle causing the latter to advance, means operable upon completion of a winding operation for stripping the wound mass from the spindle, means for clamping the strand between the stripped mass and the supply, means for severing the strand between the stripped mass and the point of holding, and automatic means for moving the spindle endwise to cause it to engage the strand while the latter is held, and for rotating the spindle to wind the strand.

14. In a machine for winding a strand drawn from a supply into a mass, the combination of a winding head, a rotary spindle mounted for endwise advancing and retractile movement through said head, the contact with said head of the mass wound on said spindle causing the latter to advance, means operable upon completion of a winding operation for stripping the wound mass from the spindle, a clamp for holding the strand between the stripped mass and the supply, knife mechanism for severing the strand between the stripped mass and the clamp, means for operating the clamp and knife mechanism, said clamp acting ahead of the knife mechanism, and automatic means for moving the spindle endwise to cause it to engage the strand while the latter is held, and for rotating the spindle to wind the strand.

15. In a machine for winding a strand drawn from a supply into a mass, the combination of a winding head, a rotary spindle mounted for endwise advancing and retractile movement through said head, the contact with said head of the mass wound on said spindle causing the latter to advance, means for rotating the spindle, positive means for effecting endwise movement of said spindle to strip the wound mass therefrom, a movable support for receiving and discharging the stripped mass, means for holding the strand between the stripped mass and the supply, means for severing the strand between the stripped mass and the point of holding, automatic means for effecting endwise movement of the spindle to cause it to engage the strand between the supply and the point of holding, and means for actuating the holding means, the severing means, the support, the means for effecting endwise movement of the spindle, and the rotating means.

16. In a machine for winding a strand drawn from a supply into a mass, the combination of a winding head, a rotary spindle mounted for endwise advancing and retractile movement through said head, the contact with said head of the mass wound on said spindle causing the latter to advance, means for rotating said spindle, means for starting and stopping said rotating means, positive means for effecting endwise movement of said spindle to strip the wound mass therefrom, a support for receiving the stripped mass, means for holding the strand between the stripped mass and the supply, means for severing the strand between the stripped mass and the point of holding, means for effecting endwise movement of the spindle to engage the strand between the supply and the point of holding, and mechanism brought into action by said positive means for actuating the support, the holding means, the severing means, the starting and stopping means, and the means for effecting endwise movement of the spindle.

17. In a machine for winding a strand drawn from a supply into a mass, the combination of a winding head, a rotary spindle mounted for endwise advancing and retractile movement through said head, the contact with said head of the mass wound on said spindle causing the latter to advance, positive means for effecting endwise movement of said spindle to strip the wound mass therefrom, means for rotating said spindle, means for starting and stopping said rotating means, a movable support for receiving and discharging the stripped mass, means for holding the strand between the stripped mass and the supply, means for severing the strand between the stripped mass and the point of holding, means for effecting endwise movement of the spindle to engage the strand between the supply and the point of holding, and a plurality of devices brought into action by said positive means and actuating the support, the holding means, the severing means, the starting and stopping means, and the means for effecting endwise movement of the spindle.

18. In a machine for winding a strand drawn from a supply into a mass, the combination of a winding head, a rotary spindle mounted for endwise advancing and retractile movement through said head, the contact with said head of the mass wound on said spindle causing the latter to advance, positive means for effecting endwise movement of said spindle to strip the wound mass therefrom, a movable support for receiving and discharging the stripped mass, means for holding the strand between the stripped mass and the supply, means for severing the strand between the stripped mass and the point of holding, means for effecting endwise movement of the spindle to engage the strand between the supply and the point of holding, means for rotating said spindle, and means operable through a portion of the operation of said machine for actuating the support, the holding means, the severing means, the means for effecting endwise movement of the spindle, and the spindle rotating means, said actuating means starting the rotation of said spindle after the latter has been moved endwise to engage the strand between the supply and the point of holding.

19. In a machine for winding a strand drawn from a supply into a mass, the combination of a winding head, a rotary spindle mounted for endwise advancing and retractile movement through said head, the contact with said head of the mass wound on said spindle causing the latter to advance, positive means for effecting endwise movement of said spindle to strip the wound mass therefrom, a movable support for receiving and discharging the stripped mass, means for holding the strand between the stripped mass and the supply, means for severing the strand between the stripped mass and the point of holding, means for effecting endwise movement of the spindle to engage the strand between the supply and the point of holding, means for rotating said spindle, and a plurality of cams brought into operation by said positive means and actuating the support, the holding means, the severing means, the means for effecting endwise movement of the spindle, and the spindle rotating means.

20. In a machine for winding into a mass a strand drawn from a supply, the combination of a winding head, a rotary spindle mounted for endwise advancing and retractile movement through said head, the mass being wound contacting with said head, means for rotating said spindle, positive means operable between main winding operations for advancing and retracting said spindle, and means engaging the strand being drawn from the supply and operable upon breakage of said strand to render said rotating means inoperative and to move said head away from said mass.

21. In a machine for winding into a mass a strand drawn from a supply, the combination of a winding head, a rotary spindle mounted for endwise advancing and retractile movement through said head, the mass being wound contacting with said head, means for rotating said spindle, positive means operable between main winding operations for advancing and retracting said spindle, means engaging the strand being drawn from the supply and operable upon breakage of the strand to render said rotating means inoperative and to move said head away from said mass, and manual means for controlling said rotating means and moving said head back into contact with said mass.

22. In a machine for winding into a mass a strand drawn from a supply, the combination of a winding head, a rotary spindle mounted for endwise advancing and retractile movement through said head, the contact with said head of the mass being wound causing the spindle to advance, positive means operable upon completion of a main winding operation to move said spindle endwise in one direction to strip the wound mass therefrom, a movable support for receiving and discharging the stripped mass, means for holding the strand between the stripped mass and the supply, means for severing the strand between the stripped mass and the point of holding, means for effecting endwise movement of the spindle to cause it to engage the strand to begin a new winding operation, means for rotating the spindle, a group of cams for actuating the support, the holding and severing means, the means for effecting endwise movement of the spindle, and the spindle rotating means, respectively, means controlled by said positive means for bringing said cams into operation, and means controlled by said positive means for rendering said rotating means inoperative.

23. In a machine for winding a strand drawn from a supply into a cop, the combination of a winding head, a rotary spindle mounted for endwise advancing and retractile movement through said head, the engagement of the cop being wound with said head causing an advance of the spindle, means for rotating the spindle, positive means brought into action by said advance of the spindle for withdrawing the spindle from the wound mass and stopping rotation thereof, cam-actuated mechanism for temporarily supporting and discharging the stripped cop holding the strand between the cop and the supply, severing the strand between the supply and the point of holding, advancing the spindle to engage the strand so held, starting rotation of the spindle to start a new cop, and retracting the spindle after a portion of the new cop has been wound, and means actuated by said positive means for bringing said mechanism into operation.

24. In a machine for winding a strand drawn from a supply into a cop, the combination of a winding head, a rotary spindle mounted for endwise movement through said head, the engagement of the cop being wound with said head causing an advance of the spindle, means for rotating the spindle, means brought into operation by the advance of the spindle for moving the spindle endwise in one direction to strip the cop therefrom and stopping rotation of the spindle, means for holding the strand securely between the finished cop and the supply, means for cutting the strand between the finished cop and the point of holding, and automatic means for moving the spindle endwise to cause it to engage the strand, and for rotating the spindle thereafter to start the winding of a new cop.

25. In a machine for winding a strand drawn from a supply into a cop, the combination of a winding head, a rotary spindle mounted for endwise movement through said head and provided with means for receiving the strand, means for rotating the spindle, means for holding the strand in position to be introduced into said receiving means, and automatic means for moving said spindle endwise to cause said receiving means to receive the strand and for rotating said spindle to wind the strand thereon.

26. In a machine for winding a strand drawn from a supply into a cop, the combination of a winding head, a rotary spindle mounted for endwise movement through said head and provided with means for receiving the strand, means for rotating the spindle, means for holding the strand in position to be introduced into said receiving means, and means for first moving said spindle endwise in one direction to cause said receiving means to receive the strand which is then wound upon the spindle by rotation of the latter, and for subsequently moving said spindle endwise in the other direction to bring the mass of wound strand thereon into contact with said winding head.

27. In a machine for winding a strand drawn from a supply into a cop, the combination of a winding head, a rotary spindle mounted for endwise movement through said head and provided with means for holding the strand to cause it to be wound on the spindle as the latter rotates, means for rotating the spindle, means operable on the completion of a cop to move the spindle endwise to withdraw it from the finished cop, means for positioning the strand, said positioning means lying close to the winding head, means for moving the spindle endwise to cause its holding means to engage the strand so that the latter will be wound on the spindle to form a new cop, and means for starting said rotating means after the holding means have engaged the strand.

28. In a winding machine, the combination of a winding head, a rotary spindle mounted for endwise movements through said head in both directions, the contact with said head of the mass wound on said spindle causing the latter to move in one direction, a pair of means for moving said spindle in one direction, and a separate positive means for moving said spindle in the opposite direction, the movement of said spindle by said positive means withdrawing the spindle from the wound mass.

29. In a winding machine, the combination of a winding head, a rotary spindle mounted for endwise movements through said head in both directions, the contact with said head of the mass wound on said spindle causing the latter to move in one direction, positive means operable to move said spindle in one direction to withdraw it from the wound mass, and a pair of separate means for effecting partial endwise movements of the spindle in both directions.

30. In a winding machine, the combination of a winding head, a rotary spindle mounted for endwise movements through said head in both directions, the contact with said head of the mass wound on said spindle causing the latter to move in one direction, positive means operable to effect complete endwise movement of the spindle in one direction as a result of which the spindle is withdrawn from the wound mass, and separate means for effecting partial endwise movements of the spindle in both directions.

31. In a winding machine, the combination of a winding head, a rotary spindle mounted for endwise movements through said head in both directions, the contact with said head of the mass wound on said spindle causing the latter to move endwise in one direction, positive means operable to move said spindle endwise in one direction, said means including an element connected to said spindle and means acting on said element to move said spindle, and a separate positive means for moving said spindle in the direction opposite to that in which it is moved by said first positive means.

32. In a winding machine, the combination of a winding head, a rotary spindle mounted for endwise movements through said head in both directions, the contact with said head of the mass wound on said spindle causing the latter to move in one direction, positive means for moving said spindle in one direction to withdraw it from the wound mass, said means including an element connected to said spindle, and separate means acting through said element for effecting partial endwise movements of said spindle in both directions.

33. In a winding machine, the combination of a winding head, a rotary spindle mounted for endwise movements through said head in both directions, the contact with said head of the mass wound on said spindle causing the latter to move in one direction, positive means operable to move said spindle in one direction to withdraw it from the wound mass, said means including a connector and means acting on said connector to move said spindle, and separate means acting through said connector to effect a partial movement of said spindle in the other direction.

34. In a winding machine, the combination of a winding head, a rotary spindle mounted for endwise movements through said head in both directions, the contact with said head of the mass wound on said spindle causing the latter to move in one direction, positive means operable to move said spindle in one direction to withdraw it from the wound mass, said means including a connector and means acting on said connector to move said spindle, and separate means acting through said connector to effect partial endwise movements of said spindle in both directions.

35. In a winding machine, the combination of a winding head, a rotary spindle mounted for endwise movements through said head in both directions, the contact with said head of the mass wound on said spindle causing the latter to move in one direction, means for moving the spindle in the other direction to withdraw it from the wound mass, separate means for effecting partial endwise movements of said spindle in both directions, means for rotating said spindle, and means for starting and stopping the rotation of said spindle, said starting and stopping means being actuated by said spindle withdrawing and moving means.

36. In a winding machine, the combination of a winding head, a rotary spindle mounted for endwise movements through said head in both directions, the contact with said head of the mass wound on said spindle causing the latter to move in one direction, means for moving said spindle in one direction to withdraw it from the mass wound thereon, separate means for effecting partial endwise movements of said spindle in both directions, means for rotating said spindle, and control means for rendering said rotating means effective and ineffective, said control means being actuated by said withdrawing means to render said rotating means ineffective, and by said moving means to render said rotating means effective.

37. In a winding machine, the combination of a winding head, a rotary spindle mounted for endwise advancing and retractile movement through said head, the contact with said head of the mass wound on said spindle causing the latter to advance, positive means for withdrawing said spindle from the mass wound thereon, said means operating between main winding operations, and means for rotating said spindle, said rotaitng means being started and stopped under the control of said positive means.

38. In a winding machine, the combination of a winding head, a rotary spindle mounted for endwise advancing and retractile movements through said head, the contact with said head of the mass wound on said spindle causing the latter to advance, positive means for withdrawing said spindle from the wound mass, said positive means operating between main winding operations, driving means for rotating said spindle, a brake for stopping rotation of said spindle, and means actuated by said positive means for rendering said driving means and brake both operative and inoperative.

39. In a winding machine, the combination of a winding head, a rotary spindle mounted for endwise advancing and retractile movements through said head, the contact with said head of the mass wound on said spindle causing the latter to advance, a connector connected to said spindle, means acting on said connector for positively moving said spindle endwise in one direction to withdraw it from the mass wound thereon, means for moving said spindle endwise in the other direction and away from its withdrawn position, said withdrawing and moving means operating between main winding operations, driving means for rotating said spindle, a brake for stopping rotation of said spindle, and means operated by said spindle moving means for rendering said driving means and brake both operative and inoperative.

RAY C. JOHNSON.